4 Sheets—Sheet 1.

C. J. LILLOE.
Harvester.

No. 241,229. Patented May 10, 1881.

C. J. LILLOE.
Harvester.

No. 241,229.

4 Sheets—Sheet 3.

Patented May 10, 1881.

C. J. LILLOE.
Harvester.
No. 241,229.                     Patented May 10, 1881.
4 Sheets—Sheet 4.
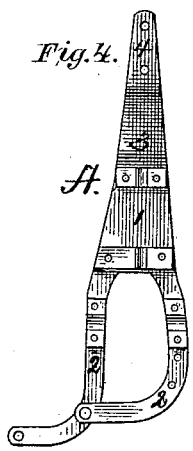
Fig. 4.
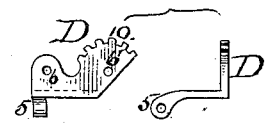
Fig. 5.
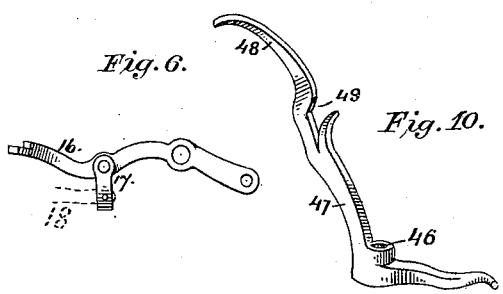
Fig. 6.   Fig. 10.
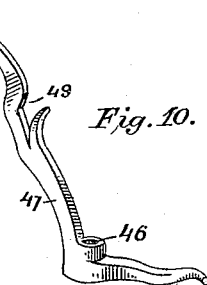
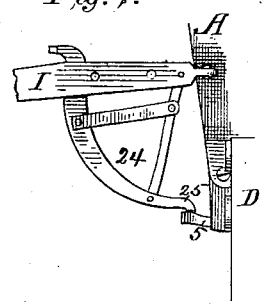
Fig. 7.
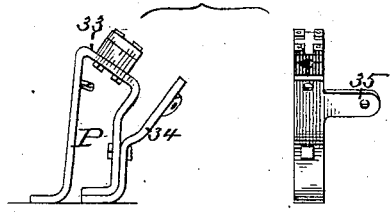
Fig. 8.
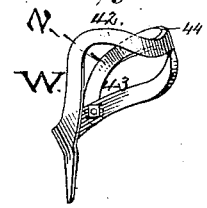
Fig. 9.
Attest:
N. H. Barnes
A. G. Heymann
Inventor:
Christian J. Lilloe
by
Attorney

UNITED STATES PATENT OFFICE.

CHRISTIAN J. LILLOE, OF BYRON, MINNESOTA.

HARVESTER.

SPECIFICATION forming part of Letters Patent No. 241,229, dated May 10, 1881.

Application filed October 15, 1879.

*To all whom it may concern:*

Be it known that I, CHRISTIAN J. LILLOE, of Byron, in the county of Olmsted and State of Minnesota, have invented certain new and useful Improvements in Harvesters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
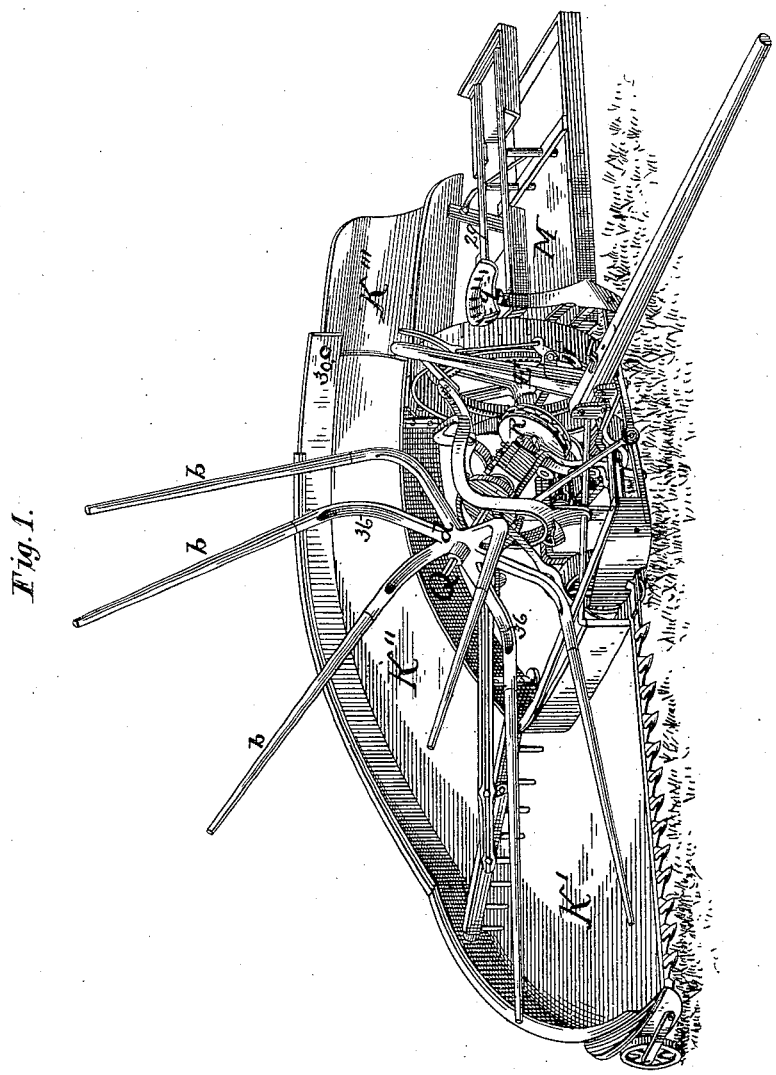
Figure 2:
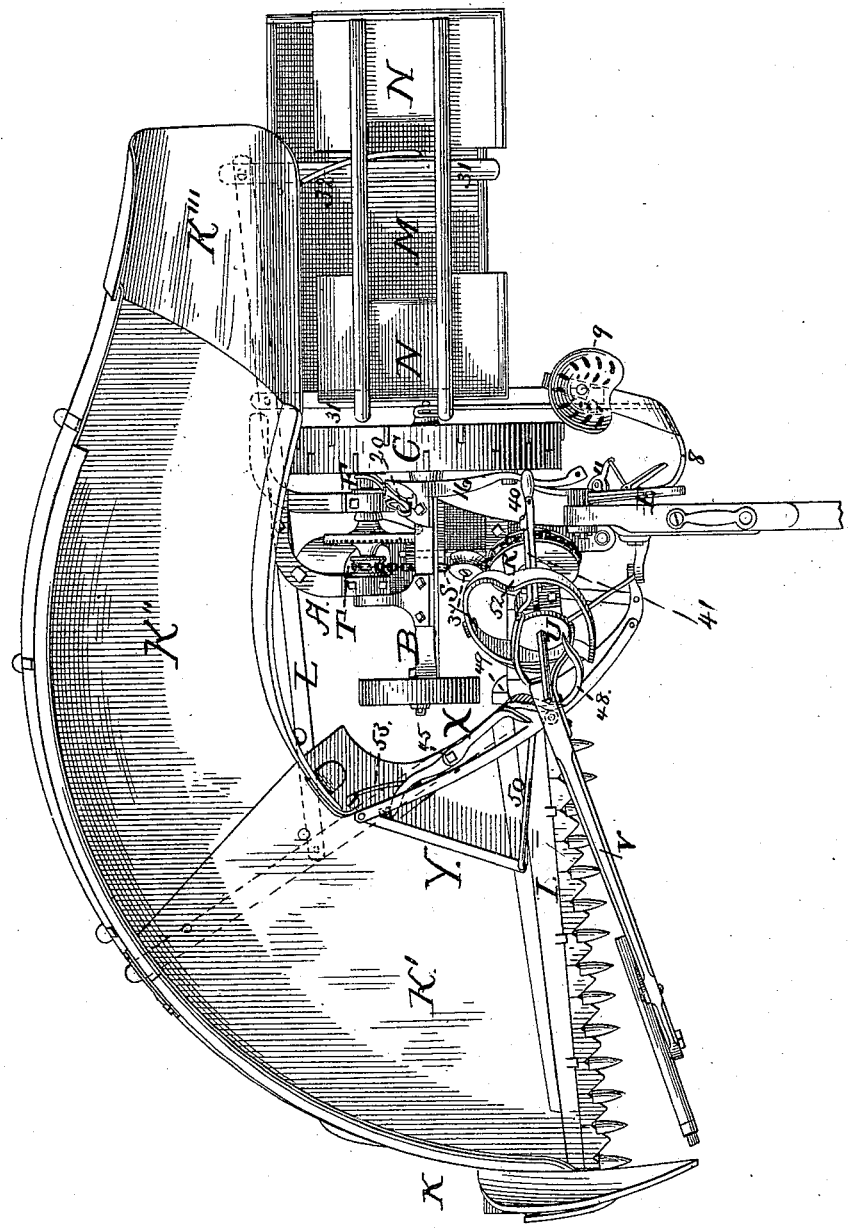
Figure 3:
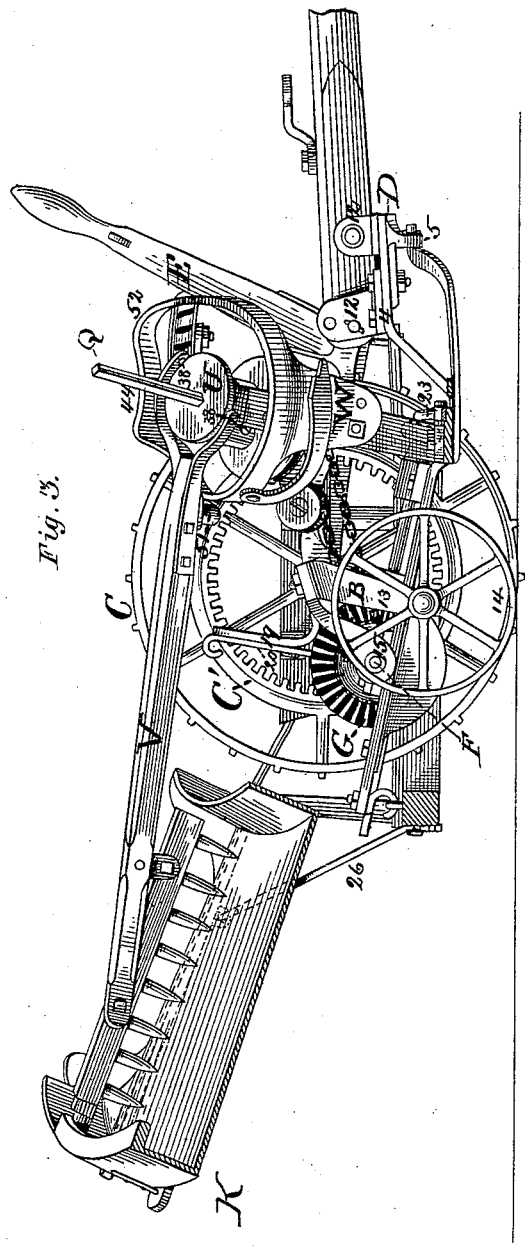

Figure 1 of the drawings is a perspective view of my improved harvester. Fig. 2 is a plan view of the same. Fig. 3 is a longitudinal sectional view, showing the operating mechanism more fully. The remaining figures of the drawings are detail views, showing the parts more fully.

My invention relates to that class of harvester-machines which are known as "single-wheel reapers," having rising and falling reel and rake arms rotating about a single axis.

The improvements consist in novel organizations of mechanisms and combinations of devices, as will be hereinafter more fully described, and pointed out specifically in the claims.

The following is a description of a machine embodying my improvements.

The letter A designates the main frame supporting the main axle B, with the driving-wheel C. The frame A (best shown in Fig. 4) is composed of the bifurcated wrought-iron bar 1, the forked portion extending rearwardly and the rear ends of the arms 2 being curved in the direction of the binder's stand. The front end of this bifurcated frame above is curved slightly at 3, bent upwardly at an angle, and thence horizontally, or nearly so, in outward direction at 4, affording means for the pole or tongue attachments. At the forward portion of this bar is attached an L-shaped piece, D, having a side arm, 5, to receive a coupling device of a jointed connection. The vertical wall of the L-shaped piece D (see Fig. 5) is perforated at 6 6', to receive one of the pole-connecting bolts and the front end of the curved bar 8, extending from the end of the axle nearest the driving-wheel.

The driving and main supporting wheel C is provided with the internally-geared rim C', which meshes with and actuates a pinion on a counter-shaft, F, to transmit motion to the cutter's crank-shaft. This curved bar 8, supported at one end by the main axle and at the other by a pole-bolt, supports the driver's seat 9.

The rear hole, 6', in the L-shaped piece receives an arm attached to one side of the lever E. The upper portion of the wall above the hole 6' is formed with a rack, 10, to receive the spring-dog 11 of the lever. The pole is placed upon the upper surface, 4, of the bar 1 and alongside of the vertical wall of the L-shaped piece D, and the side-clamping pieces 12 12, properly adjusted and attached to the upper surface of the frame A when all the parts are bolted.

One end of the main axle, B, (see Fig. 3,) is bent downwardly and outwardly, forming a crank, 13, to receive the small wheel 14. This axle is also provided with a diagonal arm, 15, extending downwardly to sustain one end of the counter-shaft F below. The other end of the main axle, inside of the drive-wheel, is formed or fitted with a cross-bar, 16, one end of which sustains or supports the other end of the counter-shaft F, working in the journal-boxes mounted on the upper surface of frame A. The forward end of said arm extends forward in front of the driving-wheel and at one side of the driver's seat, to form a foot-lever, as seen in Fig 2. Suspended from this bar 16 (see Fig. 6) is a coupling device, 17, into which is pivoted the arm 18 of lever E, to establish a connection with the operating-lever, for elevating or lowering the main frame and cutting apparatus of the machine. The main axle is also provided with a standard, 19, (see Figs. 2 and 3,) arranged on the upper surface of the axle and on the inner side of the driving-wheel, to which is fulcrumed a shifting-lever, 20, for throwing into and out of gear the pinion keyed onto the counter-shaft F. The upper end of the bracket 19 is provided with an offset, which forms a locking device for the shifting-lever when in place.

To the under side of the main frame A is secured a semicircular guard to protect the bevel-gear G, mounted on counter-shaft, and at its forward end the crank-wheel 23, to which is attached the driving-rod or pitman of the cutter-bar.

The finger-beam I, supporting the cutter-bar, is connected at its inner end to the frame A (see Fig. 7) immediately in rear of the pitmanrod. To the under side of this beam (see Fig. 7) is fastened an A-shaped wrought-iron frame, 24, the apex of the frame terminating in a bearing-arm, 25, passing into the eye of the arm 5, thereby making a jointed connection with the forward portion of the main frame.

Attached to the rear edge of the finger-beam and the front portion of the A-shaped frame is the quadrant-shaped grain-platform K, its rear end being supported by the transverse bar L and brace-bars 26, (only one shown.) The diagonal brace-bar 26 being provided with a series of perforations at its lower end permits the raising and lowering of the intermediate section, K″, of the quadrant platform, which is hinged or otherwise connected to the front portion of the platform.

The quadrant platform is composed of three sections, K′ K″ K‴, the section K′ being rigidly connected with the finger-beam by means of braces or trusses, the section K″ being hinged or pivotally connected to the first or front section, so as to be raised or lowered by means of a diagonal brace-rod, or its equivalent, the section K‴ being supported at its rear end by a pivot on the vertical post 29, and connected at its front end to the rear end of the intermediate section, K″, by the side pivots, 30, which may work in slots if deemed necessary. By this means of connecting the sections of the grain-platform the middle section can be lowered and the rear section tilted up to form a receptacle to collect and hold the grain for the binders on the stand.

M represents the binders' platform arranged outside of the driving-wheel. The inner front portion of the binders' frame is suspended from the curved bar 8 by means of an arm, and is supported at its rear end by means of the longitudinal bars 31 suitably bolted to the transverse bar L. The tables N N of the binders' stand are properly raised upon the posts, and the outer end of the stand is strengthened by means of a diagonal brace, 32. This method of supporting and bracing the binders' stand parallel with the rear end of the grain-platform will secure the same in a rigid manner in close proximity to the grain-platform.

Mounted on the upper surface of the finger-beam I (see Fig. 8) are two standards, P, united at their upper ends, forming an incline bearing-surface, 33, upon which is arranged the reel-shaft Q. The object of journaling the reel-shaft in this inclined manner is for the purpose of more effectually carrying the reel and rake arms clear of the driving-wheel and operating mechanism and of the driver on his seat by causing them to move upward on a line or nearly parallel with the axis. The lower end of the reel-shaft Q has its bearing in the bracket-arm 34 bolted to the standard nearest the driving-wheel to prevent any end movement of the reel-shaft. This bracket-arm 34 is provided with a side arm to support and guide roller 37, under which a drive-chain passes, presently to be described.

At the upper end of the inclined reel-shaft are arranged a number of reel-arms, b, attached to a hub, d, for feeding the standing grain to the cutters or cutting-knives. The hub of the rake-reel is formed of a single piece of metal, from which extends the curved arms 36, made hollow at their extreme portions to receive the bars b. The lower end of the reel-shaft Q is provided with a sprocket-wheel, R, over which passes the drive-chain S, thence passing rearwardly under the guide-roller 37 to the small sprocket-wheel T on the counter-shaft.

Intermediately arranged on the reel-shaft, between the reel and the bearing-box, is arranged a collar or disk, U, having side bearings, 38, arranged nearly opposite each other, to which is pivoted the yoke portion of the rake-arm V. The under side of this disk or collar is formed with a groove, into which the fork ends 39 rest of the lever 40, which is pivoted to the arm 41 attached to their standard. The upper end of the arm 41 is notched to receive the pivoted dog attached to the upper end of the lever 40. The object of operating the disk U by means of the lever is to throw the rake into or out of motion.

To the front or outer standard supporting the inclined shaft is secured a prolonged arm of the cam W. This cam (best shown in Fig. 9) is composed of the raised and depressed semicircular rings, 42 and 43, over which the rake-arm passes, the depressed portion 44 affording means to hold the rake-arm when out of its motion, engaging with the cam W. This cam-ring W is provided with a pivoted switch, Z, the object of which is, when the machine is used as a harvester—that is to say, when the sections K″ K‴ of the grain-platform and the binders' stand are removed from the machine—to elevate the rake suddenly just as it has reached the rear end of the grain-platform K′.

At its forward portion, in line with the cutters, or nearly so, is a curved arm X, which is pivoted to the grain-platform at 45, the toe portion extending beyond its pivot, as shown in Fig. 2. This curved arm (best seen in Fig. 10) is formed with a journal-bearing, 46, and a toe portion curved sidewise, an angular portion, 47, and the curved portion 48, at its upper end. The curved portion near the junction with the angular portion is provided with an angular slot or recess, 49, for the purpose presently to be explained.

The grain-platform is provided, at its inner side nearest the driving-wheel, immediately at the rear of the cutters, with a gate, Y, pivoted as shown in Fig. 2 of the drawings. Engaging with this gate at its rear end is the toe portion of the curved arm X, fitting into an eye, and the forward portion is provided with a cut-off, 50, which will receive any grain that might fall while the gate Y is arranging the grain on the platform for the rake.

It will be seen, by reference to Fig. 2 of the drawings, that the upper portion of the curved arm X rests slightly within the cam-face of the cam W, and as the rake-arm carrying the anti-friction roller 51 is caused to move forward to rake the grain back on the platform, and as it passes the highest point, 52, of the cam W it falls upon the curved portion of the curved arm X, and the anti-friction roller thereof acts upon the front face, withdraws the upper portion of the arm inwardly, causing it to leave its rest, and forces the toe portion outwardly to act upon the pivoted gate Y, and the anti-friction roller, continuing its passage downward, is forced through the angular slot 49, which movement causes the gate to move outward to pack the fallen grain upon the platform from within the passage of the rake, which carries it to the rear of the platform for the binder. The instant the anti-friction roller of the rake-arm passes through the angular slot the gate is restored to its normal position by means of a spring, 53. This movement of the gate with its cut-off is momentary, and hence does not interfere with the progress of the grain at the inner end over the cutters onto the platform.

The outer forward end of the platform is provided with the usual shape-divider and grain-wheel.

It is obvious that the machine may be used as a mower by detaching the raking and reel means and the binders' platform; also the machine may be used without the binders' platform.

Many of the features and combinations of parts embodied in this machine are, broadly, old, and are therefore not claimed by me. For instance, I do not broadly claim the combination of a cutting apparatus and a reel arranged at an acute angle thereto, nor the combination, broadly, of an operating mechanism, a cam device, and a raking means; nor do I broadly claim the combination of a cutting apparatus, a grain-platform, a raking means, and a binders' stand; but

What I claim as my invention, and desire to secure by Letters Patent, is—

1. The combination, with the frame A, the L-shaped piece D, having a side arm, 5, and the frame 24, substantially as described.

2. The main axle B, provided with the transverse pendent arm 15, extending downwardly to support one end of the counter-shaft, substantially as described.

3. The main axle B, having at one end, near the driving-wheel, the cross-bar 16, the rear end of which supports one end of the counter-shaft, and the front end extended forward and provided with a coupling device, 17, to which lever E is attached, substantially as described.

4. The combination, with the finger-beam I and the main frame A, of the iron frame 24, having its apex terminating in a bearing-arm, 25, passing into the eye of the arm 5, forming a joint connection, substantially as described.

5. The grain-platform K, consisting of the sections K' K'' K''', the sections K'' K''' being so coupled and arranged as to be depressed to or raised above the level of the section K', and thus to form a receptacle into which to collect the grain for the binders on the stand, substantially as described.

6. In combination with the sections K' K'' K''' of the grain-platform, capable of forming a receptacle for the grain, the binders' platform arranged outside of the driving-wheel, substantially as described.

7. The binders' platform M, carrying the tables, the inner front portion of which is suspended from the brace-bar 8, and the rear portion suspended from the longitudinal bars 31, suitably fastened to the transverse bar L, substantially as described.

8. The standard P, having the side-arm 34, with bracket 35, affording means for the attachment of a guide-roller and a beam for the lower end of the reel-shaft, substantially as described.

9. The combination, with the grain-platform, of the pivoted gate Y, curved arm X, with angular slot 49, cam W, and rake-arm V, substantially as described.

10. The gate Y, pivoted at its rear end to the inner rail of the grain-platform, and provided at its upper forward end with the cut-off 50, substantially as and for the purpose set forth.

11. The combination, with the operators' supporting-platform located at the side of the driving-wheel, and a binding-table secured above and over said supporting-platform, of a gavel-receiving table located in rear of the driving-wheel and binding-table, substantially as described.

12. The combination, with the binding-table located at the side of the driving-wheel, of a hinged gavel-receiving table located in rear of the driving-wheel and binding-table, said hinged gavel-receiving table capable of being elevated to bring the gavel within reach of the binders, substantially as described.

13. The combination, with the binders' supporting-platform located outside of and opposite the main supporting-wheel, of the raking apparatus, the spirally-inclined platform, and receiving-table, the latter located within easy reach of the binders' supporting-platform, substantially as described.

14. The combination, with the platform of a self-raking reaper, a gavel-receiving table, and an intermediate spirally-inclined section or portion of a platform, of a binding-table and an operators' supporting-platform, both located at the side of the driving-wheel and in front of the gavel-receiving table, substantially as described.

15. The combination, with the platform of a self-raking reaper, a hinged gavel-receiving table, and an intermediate spirally-inclined section of a platform, of a binding-table and an operators' supporting-platform, substantially as described.

In testimony that I claim the foregoing as my own I affix my signature in presence of two witnesses.

CHRISTIAN JOHNSON LILLOE.

Witnesses:
PETER H. MUNDD,
ANTHON CHASPERSON.